United States Patent
Wagner et al.

(10) Patent No.: US 11,544,537 B2
(45) Date of Patent: Jan. 3, 2023

(54) TOKEN-POSITION HANDLING FOR SEQUENCE BASED NEURAL NETWORKS

(71) Applicant: Microsoft Technology Licensing, LLC, Redmond, WA (US)

(72) Inventors: Andrew Wagner, Cupertino, CA (US); Tiyasa Mitra, San Jose, CA (US); Sujeeth Subramanya Bharadwaj, Milpitas, CA (US); Marc Tremblay, Bellevue, WA (US); Saurabh Mohan Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 366 days.

(21) Appl. No.: 16/848,748

(22) Filed: Apr. 14, 2020

(65) Prior Publication Data

US 2021/0319288 A1  Oct. 14, 2021

(51) Int. Cl.
*G06F 40/289* (2020.01)
*G06N 3/08* (2006.01)
*G06N 3/04* (2006.01)
*G06K 9/62* (2022.01)

(52) U.S. Cl.
CPC ......... *G06N 3/0472* (2013.01); *G06F 40/289* (2020.01); *G06K 9/6256* (2013.01); *G06N 3/08* (2013.01)

(58) Field of Classification Search
CPC ...... G06N 3/0472; G06N 3/08; G06N 3/0454; G06F 40/289; G06F 40/216; G06F 40/284; G06F 40/44; G06K 9/6256
See application file for complete search history.

(56) References Cited

PUBLICATIONS

Devlin, et al., "Bert: Pre-Training of Deep Bidirectional Transformers for Language Understanding", In Repository of arXiv:1810.048052, May 24, 2019, 16 Pages.
Lewis, et al., "BART: Denoising Sequence-to-Sequence Pre-training for Natural Language Generation, Translation, and Comprehension", In Repository of arXiv:1910.13461v1, Oct. 29, 2019, 10 Pages.
"International Search Report and Written Opinion Issued in PCT Application No. PCT/US2021/017320", dated May 28, 2021, 26 Pages.
Vaswani, et al., "Attention is All You Need", In Repository of arXiv:1706.03762v5, Dec. 6, 2017, 15 Pages.
Wang, et al., "From Static to Dynamic Word Representations: A Survey", In International Journal of Machine Learning and Cybernetics, vol. 11, Issue 7, Feb. 17, 2020, pp. 1611-1630.

*Primary Examiner* — Thierry L Pham
(74) *Attorney, Agent, or Firm* — Fountainhead Law Group PC

(57) ABSTRACT

Embodiments of the present disclosure include a method for token-position handling comprising: processing a first sequence of tokens to produce a second sequence of tokens, wherein the second sequence of tokens has a smaller number of tokens than the first sequence of tokens; masking at least some tokens in the second sequence to produce masked tokens; moving the masked tokens to the beginning of the second sequence to produce a third sequence; encoding tokens in the third sequence into a set of numeric vectors in a first array; and processing the first array in a transformer neural network to determine correlations among the third sequence, the processing the first array producing a second array.

20 Claims, 7 Drawing Sheets

TOKEN-POSITION HANDLING FOR SEQUENCE BASED NEURAL NETWORKS

BACKGROUND

The present disclosure relates to a computing. More particularly, the present disclosure relates to techniques for accelerating sequence-based neural network training.

Natural-language understanding (NLU) is a subfield of natural-language processing (NLP) in artificial intelligence that addresses comprehension by computers of the structure and meaning of human language. NLU enables voice technology (e.g., Cortana), search engines (e.g., Bing®), and machine translation (e.g., Microsoft® Translator) to deduce what a user means, regardless of the way it is expressed.

A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

As used herein, a neural network (also referred to as an artificial neural network (ANN)) is a computing system made up of a number of simple, highly interconnected processing elements, which process information by their dynamic state response to external inputs. In other words, a neural network is a computational model inspired by the way biological neural networks in the human brain process information. Neural networks are typically organized in layers. Layers are made up of interconnected nodes which contain an activation function. For example, each connection transfers the output of a neuron i to the input of a neuron j and each connection is assigned a weight $w_{ij}$. The activation function (or transfer function) of a node defines the output of that node given an input or set of inputs. Patterns are presented to the network via the input layer, which communicates to one or more hidden layers where processing is done via the system of weighted connections. The hidden layers then link to an output layer.

As used herein, training (or learning) is a supervised process that occurs with each cycle (e.g., each time a neural network is presented with a new input pattern) through a forward activation flow of outputs, and the backwards error propagation of weight adjustments. When a neural network is initially presented with a pattern it generates a result based on initial values of the weights. The neural network then sees how far its answer was from the actual one and makes an appropriate adjustment to its connection weights. Training then modifies the parameters (e.g., weights and thresholds) of the neural network, so a given input to the network will produce a favored output. One common training algorithm is referred to as backpropagation. In back propagation, an error between a result of the neural network is compared to a known result for the given input (e.g., from a training set) and the error (aka "delta") is successively back propagated from the output layer to an input layer to adjust the weight values.

Figure 1:
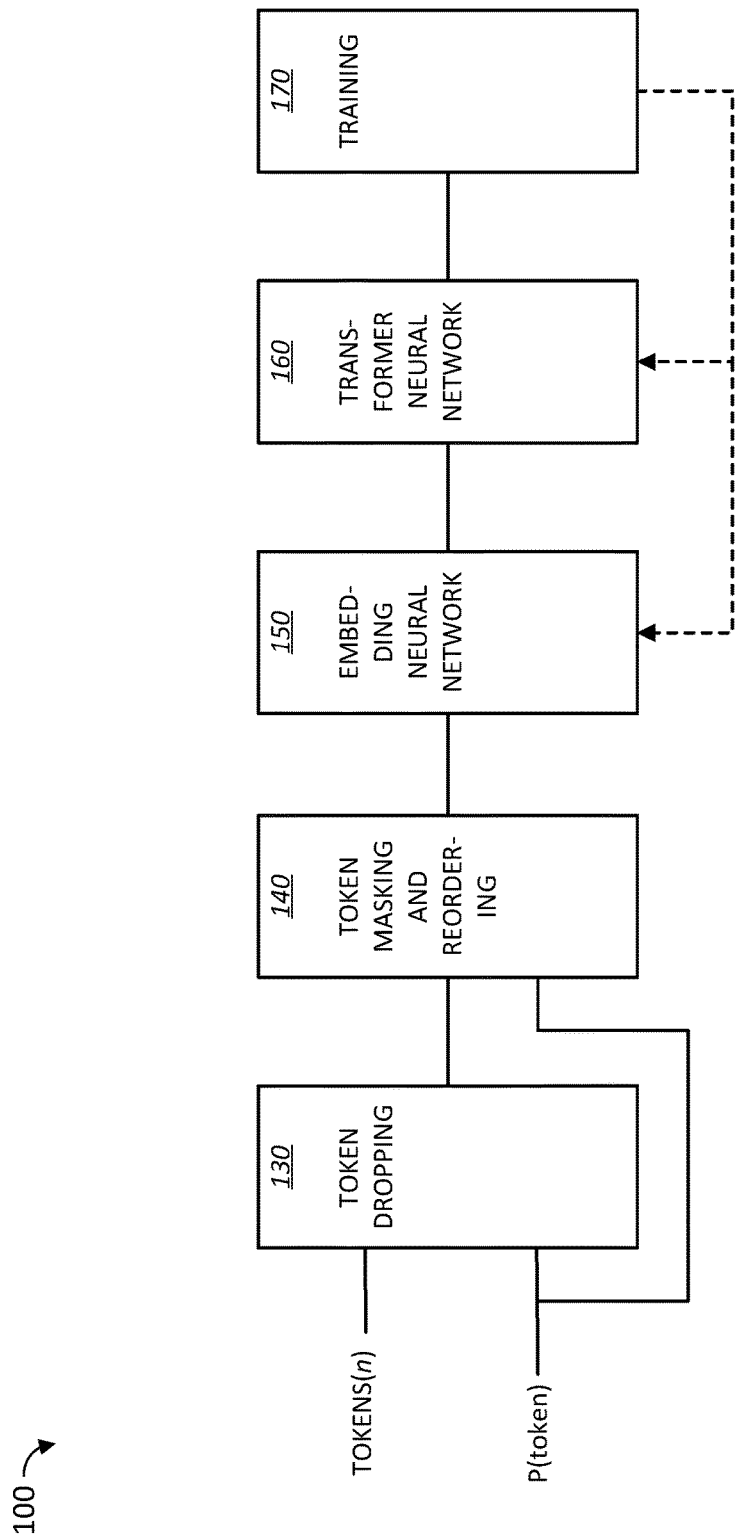
FIG. 1 illustrates a simplified block diagram of a system environment according to various embodiments.

Features and advantages of the present disclosure include techniques for accelerated training. FIG. 1 illustrates system environment 100 in accordance with certain embodiments. As shown, system environment 100 includes token dropping 130, token masking and reordering 140, embedding neural network 150, transformer neural network 160, and training 170. According to some embodiments, token dropping 130 receives an input sequence (e.g., one or more sentences) of tokens (e.g., words). Token dropping 130 may remove (drop) some tokens from the sequence without adversely affecting training. For example, some words—such as articles "a," "an," and "the"—may not provide information about the meaning (context) of the sentence.

Token dropping 130 may use a (relative) probability, P(token), of each token in the sequence—appearing in the sequence, appearing in the vocabulary, and the like—to select the token(s) to throw out. For example, common or redundant words (e.g., that have a high (relative) probability of occurring) may be dropped. Token dropping may receive (a sequence of) n tokens, TOKENS(n), as input and output (a sequence of) k tokens, where n>k. Reducing the number of tokens in a sequence may advantageously reduce the number inputs to the neural network to be trained. Token dropping 130 may also output position information for each of the k tokens in the output sequence.

Token masking and reordering 140 may receive a sequence of tokens and position information for each token from token dropping 130. Token masking and reordering 140 may also receive a (relative) probability of the token appearing (e.g., in a sequence, in a vocabulary, etc.). Token masking and reordering 140 may mask tokens in the sequence. In some embodiments, the masked token is hidden and during training a neural network (e.g., transformer neural network 160) guesses what the masked token is.

Given their frequency, neural networks train on many examples of common tokens (e.g., tokens with a high (relative) probability of appearing in a sequence, in a vocabulary, etc.), relative to less common tokens. To improve training, rare tokens may be selected for masking. According to some embodiments, if a token appears frequently, then it is less likely to be masked. If a token occurs infrequently, then it is more likely to be masked.

For example, to mask tokens occurring less often, an inverse of the probability of a token occurring may be used to select the masked tokens:

$$\text{inverse probability} = \frac{1}{P(\text{token}) + \varepsilon} \quad (1)$$

where P(token) is the probability of a token occurring and £ is a small term used to keep the inverse probability from going to ∞ when P(token) is 0. Other functions or combinations of functions may be used to select tokens for dropping and/or tokens for masking (e.g., by token dropping 130), such as other probability distributions, entropy in the sequence, and the like.

According to some embodiments, token masking and reordering 140 reorders the tokens in the sequence. That is, the order of the tokens in the sequence is changed. For example, the masked tokens are moved to the beginning of the sequence.

Embedding neural network 150 may receive a sequence of tokens and position information for the tokens from token masking and reordering 140. Embedding neural network 150 may encode each of the tokens into one or more floating-point numbers (e.g., IEEE-754). In some embodiments, masked tokens may be mapped to a vector of zeroes (1s). Embedding neural network 150 may produce an S×H array of vectors (matrix), which represents the sequence (e.g., one or more sentences). Dimension S is the length of (number of words or tokens in) the sequence and dimension H is the size of a token (word). Each row of the S×H matrix stores an encode token. By way of further example, H may be a vector of 128, 256, 1024, 2048, 4096, etc. floating-point numbers.

In one embodiment, the vectors in the matrix are at least approximately orthogonal. That is, each token is orthogonal or are as close as possible to being orthogonal in the context of the overall system design. Orthogonal tokens have a unique (mutually exclusive) representation. For example, the tokens can be represented using one-hot encoding (e.g., a vector) to distinguish each token in a vocabulary from the other tokens in the vocabulary. A one-hot vector consists of 0s in all cells except for a single 1 in a cell used to uniquely identify the token. However, certain embodiments may use tokens that are not perfectly orthogonal, but rather, approximately orthogonal (semi-orthogonal). For example, the size of the vocabulary (e.g., on the order of 30,522 words) exceeds what can be uniquely represented in a one-hot vector of size H. Accordingly, the tokens cannot be fully orthogonal, but the tokens are as close as possible to being orthogonal in the context of the overall system design.

Transformer neural network 160 (also known as a "transformer") may receive the matrix from embedding 150. In some embodiments, transformer neural network 160 may be a neural network having a sequence-to-sequence architecture. In other words, transformer neural network 160 transforms a given sequence of elements, such as the sequence of words in one or more sentences, into another sequence. Transformer neural network 160 can determine relationships/correlations between tokens in the matrix. Transformer neural network 160 processes tokens in relation to all the other tokens in a sequence, instead of one-by-one in order. Transformer neural network 160 considers the full context of a token by looking at the tokens that come before and after it.

Applications for sequence-based neural networks include language translation (e.g., the input sequence is in one language and the output is in another), search (conversational queries), speech recognition (e.g., the inputs are audio samples and the outputs are text transcriptions of the audio samples), and the like. Other applications include: document summarization, document generation, named entity recognition (NER), speech recognition, and biological sequence analysis. Non-limiting examples of transformer neural network 160 include such models as Bidirectional Encoder Representations from Transformers (BERT), Microsoft Machine Reading Comprehension (MS MARCO), Stanford Question Answering Dataset (SQuAD), Multi-Task Deep Neural Networks for Natural Language (MT-DNN), and the like.

Training 170 trains the neural networks (e.g., embedding neural network 150 and transformer neural network 160) to improve their outputs. In various embodiments, training 170 compares the output from transformer neural network 160 to a known result for the input sequence. Training 170 can determine how closely the output approximates the known result, sometimes referred to a cost function, loss function, and objective function. Training 170 can compute the gradient of the cost function to adjust weights, thresholds, and biases of) the neural networks. By way of non-limiting example, backpropagation is used to compute the gradient and stochastic gradient descent is used to adjust the neural networks.

Figure 2:
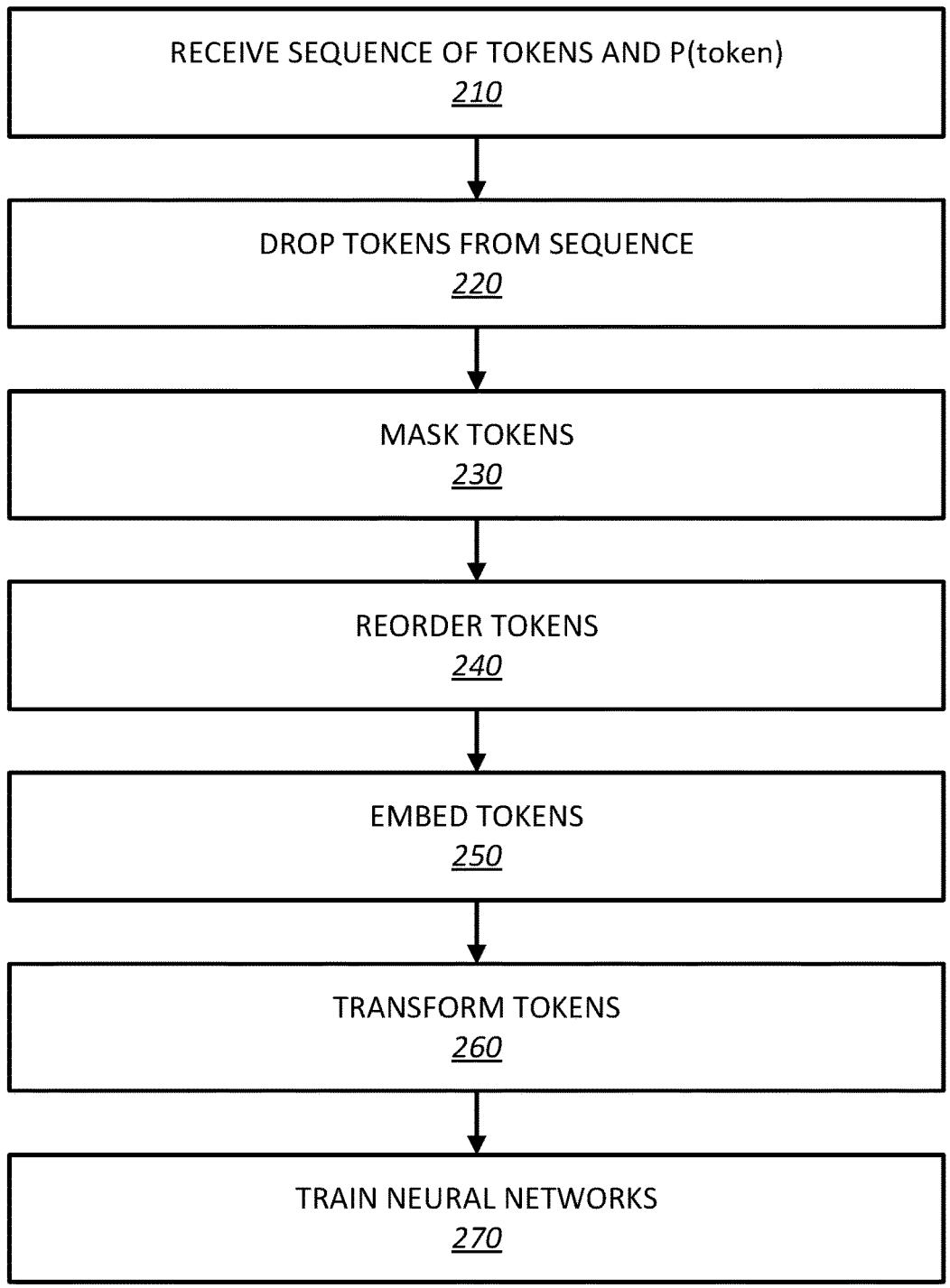
FIG. 2 illustrates a flow diagram for training a neural network according to various embodiments.

FIG. 2 illustrates method 200 that may be performed by system environment 100 (FIG. 1) for training a transformer neural network, in accordance with certain embodiments. Commencing at step 210, an input sequence of tokens and (relative) probabilities associated with the occurrence of the tokens may be received. At step 220, tokens in the input sequence may be selected and the selected tokens may be removed from the input sequence. For example, k tokens (out of n tokens) remain in the sequence after tokens are dropped. The tokens may be selected based on the (relative) probability of each token appearing in the sequence, in the vocabulary, and the like. Generally, the selected (and dropped) tokens do not provide useful information (context) about the sequence for training purposes. In accordance with some embodiments, step 220 can be performed by token dropping 130.

At step 230, tokens in the sequence (with the dropped tokens omitted) may be selected and the selected tokens masked. For example, m tokens in the sequence may be masked. The tokens may be selected based on the inverse (relative) probability of each token appearing in the sequence, in the vocabulary, and the like. Generally, the selected (and masked) tokens appear rarely in sequences and masking these tokens accelerates neural network (e.g., transformer neural network 160 (FIG. 1)) training. Step 230 may be performed by token masking and reordering 140.

At step 240, the tokens in the sequence may also be reordered. For example, the sequence may be reordered by placing the masked tokens at the front (at the beginning) of the sequence. Step 240 may be performed by token masking and reordering 140.

At step 250, each token in the masked sequence may be encoded into a vector with position information. For example, each of the tokens can be encoded into one or more floating-point numbers (e.g., IEEE-754). In various embodiments, masked tokens may be mapped to a vector of zeroes (0s). Step 250 may produce an S×H array of vectors (matrix), where dimension S is the length (number of words or tokens) in a sequence (sentence) and dimension H is the size of a token (word). Each row of the S×H matrix stores a token. The vectors are at least approximately orthogonal. Step 250 may be performed by embedding neural network 150.

At step 260, the S×H matrix may be transformed using a transformer neural network (e.g., transformer neural network 160) to produce a transformed matrix. At step 270, one or more of the neural networks (e.g., embedding neural network 150 and transformer neural network 160 in FIG. 1) can be trained using the transformed matrix and a known result set corresponding to the input matrix. In accordance with some embodiments, step 270 is performed by training 170.

Figure 3:
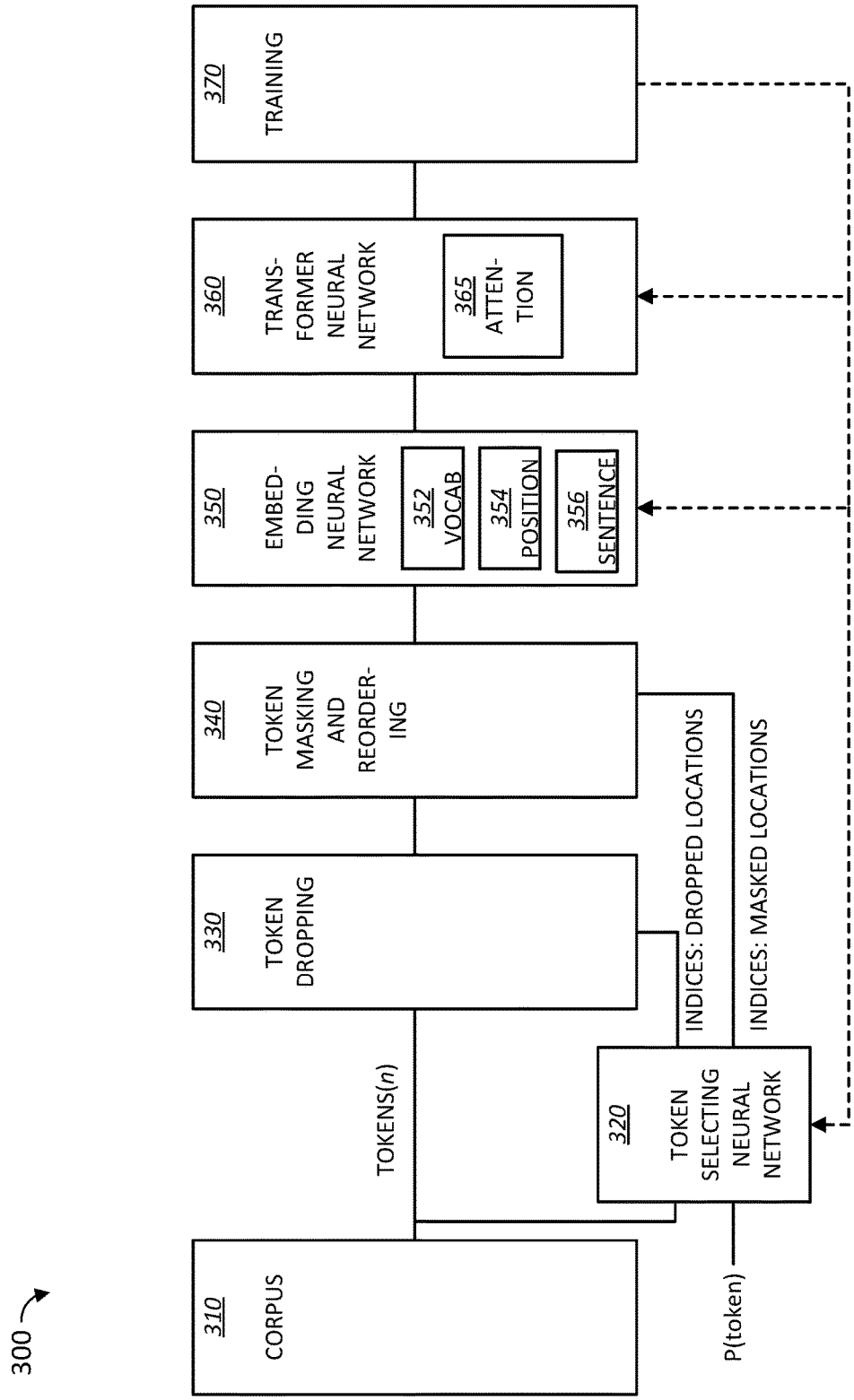
FIG. 3 illustrates a simplified block diagram of a system environment according to various embodiments.

FIG. 3 illustrates system environment 300 in accordance with some embodiments. System environment 300 includes corpus 310, token selecting neural network 320, token dropping 330, token masking and reordering 340, embedding neural network 350, transformer neural network 360, and training 370. Corpus 310 comprises sequences of words (tokens) such as in sentences, paragraphs, etc. For example, corpus 310 can comprise a newspaper or magazine article, book, Wikipedia® article, and the like.

As shown in FIG. 3, token selecting neural network 320 may receive an input sequence of tokens, TOKENS(n), from corpus 310 and a probability of each token occurring (e.g., in the sequence, in the vocabulary, etc.), P(token). According to some embodiments, token selecting neural network 320 may determine tokens in the sequence to be dropped and tokens to be masked using P(token). According to various embodiments, token selecting neural network 320 may provide indices (e.g., locations of tokens in the sequence to be dropped) to token dropping 330 and indices (e.g., locations of tokens in the sequence to be masked) to token masking 340.

Token dropping 330 may receive the input sequence of tokens, TOKENS(n), from corpus 310 and indices (e.g., locations of tokens in the sequence to be dropped) from token selecting neural network 320. Token dropping 330 removes tokens, identified by the indices, from the input sequence. For example, token dropping 330 may receive an input sequence of n tokens and, after dropping tokens, output a sequence of k tokens. Token dropping 330 has at least some of the characteristics of token dropping 130 (FIG. 1).

Token masking and reordering 340 may receive a sequence of tokens (without the dropped tokens) from token dropping 330 and indices (e.g., locations of tokens in the sequence to be masked) from token selecting neural network 320. Token masking and reordering 340 may mask tokens, identified by the indices, in the sequence. For example, token masking and reordering 340 may mask m out of k tokens. Token masking and reordering 340 may also reorder the tokens in the sequence. For example, the masked tokens are moved to the beginning of the sequence. Token masking and reordering 340 has at least some of the characteristics of token masking and reordering 140 (FIG. 1).

Embedding 350 comprises vocabulary 352, position 354, and sentence 356. In some embodiments, each of vocabulary 352, position 354, and sentence 356 may be a (static) table, a neural network, and the like. Embedding 350 may receive a sequence(s) of tokens, position information for the tokens, and sentence information from token masking and reordering 340. Embedding neural network 350 may have at least some of the characteristics of embedding neural network 150. Generally, embedding neural network 350 may sum the outputs of vocabulary 352, position 354, and sentence 356 to produce an S×H matrix.

Vocabulary 352 may receive the sequence(s) of tokens and encode the tokens into a set of numbers (e.g., a vector)—such as floating-point numbers (e.g., IEEE-754). For example, each word may be mapped to a vector having length H=128, 256, 1024, 2048, 4096, etc. floating-point numbers. The mappings may be orthogonal (i.e., no two words share the same mapping) or semi-orthogonal (i.e., as close to orthogonal as the neural network in vocabulary 352 can be trained to make it). Orthogonality and semi-orthogonality were described above in relation to FIG. 1. Vocabulary 352 may be represented by a V×H matrix, where V is the size of the vocabulary (e.g., on the order of 30,522 words). According to various embodiments, masked tokens may be mapped to a vector of zeroes (0s).

Position 354 receives position information and embeds information about the position of a token in a sequence (e.g., position of a word in the sentence). Position 354 may be represented by a S'×H matrix, where S' is the maximum sequence size (maximum number of tokens). Generally, embedding neural network 150 may produce an S×H array of vectors (matrix), which represents the sequence of tokens, where S is the sequence size (number of tokens). Position 354 may support multiple sequence lengths.

Sentence 356 may receive sentence information and embed information about which sentence a token is a part of. For example, two consecutive sentences or text fragments that are related or unrelated may have a label describing which sentence or text fragment each token is in. Typically, two sentences or text fragments may be provided in a sequence to train the model to detect separate sentences or text fragments. Sentence 356 may be represented—in the case of two sentences or text fragments in a sequence—by a 2×H matrix.

Transformer neural network 360 transforms a given sequence of elements, such as the sequence of words in a sentence, into another sequence. Transformer neural network 360 can have at least some of the characteristics of transformer neural network 160 (FIG. 1). Transformer neural network 360 may get an S×H matrix from embedding 350. In various embodiments, transformer neural network 360 guesses what the masked tokens are. Transformer neural network 360 may produce a matrix also having dimensions S×H.

Transformer neural network 360 comprises attention mechanism 365 which can include multiple (sub) neural networks. Attention mechanism 365 looks at an input sequence and decides which other parts of the sequence are important. Attention mechanism 365 can model relationships between tokens in a sequence, regardless of their respective position. To compute the next representation for a given token, attention mechanism 365 may compare it to every other token in the sequence, for example. The result of these comparisons is an attention score for every other token in the sequence. These attention scores determine how much each of the other tokens should contribute to the next representation for the given token. The attention scores are then used as weights for a weighted average of all tokens' representations which is fed into a fully-connected network to generate a new representation for the given token.

Training 370 trains the neural networks (e.g., token selecting neural network 320, embedding neural network 350, transformer neural network 360), to improve their output. Training 370 has at least some of the characteristics of training 170 (FIG. 1).

Figure 4:
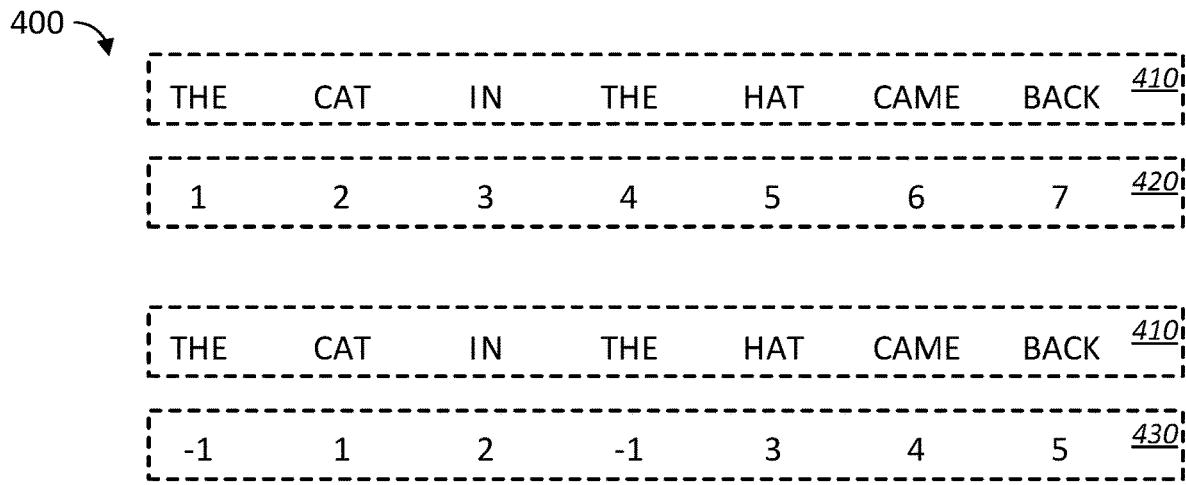
FIGS. 4-6 illustrate example drop, mask, and reorder operations, respectively, according to various embodiments.

FIG. 4 illustrates example drop operation 400 which may be performed by token dropping 130 (FIG. 1) and token dropping 330 (FIG. 3). Prior to the drop operation, tokens in sequence 410 have respective positions 420. In the example of FIG. 4, two instances of token "the" are discarded and dropped tokens have a position of −1. Upon completion of the drop operation, tokens in sequence 410 have respective positions 430.

Figure 5:
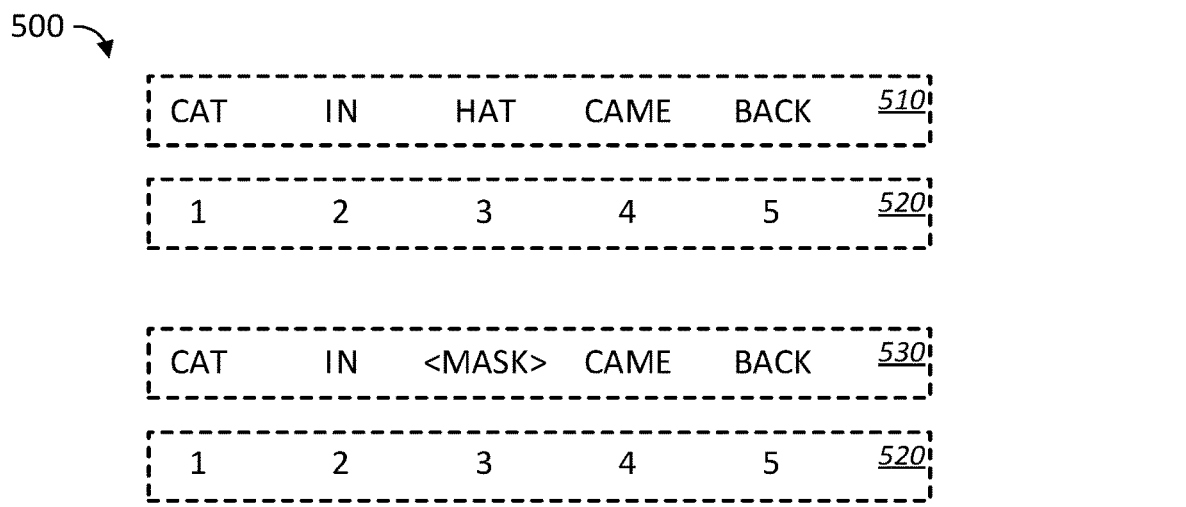

FIG. 5 illustrates example mask operation 500 which may be performed by token masking and reordering 140 (FIG. 1) and token masking and reordering 340 (FIG. 3). Prior to the mask operation, tokens in sequence 510 have respective positions 520. In the example of FIG. 5, the token "hat" is masked. Upon completion of the mask operation, tokens are in sequence 530 having respective positions 520.

Figure 6:
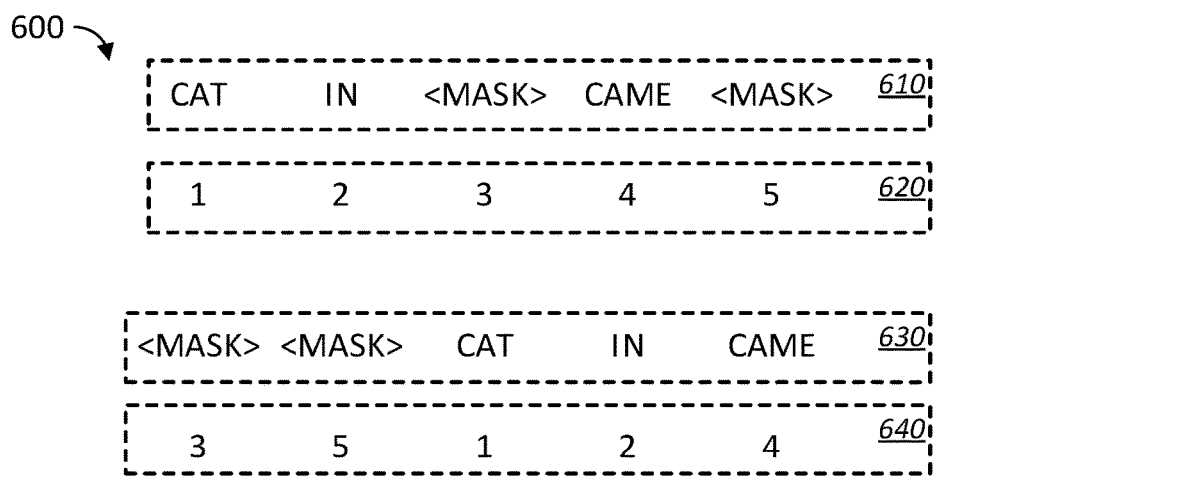

FIG. 6 illustrates example reorder operation 600 which may be performed by token masking and reordering 140 (FIG. 1) and token masking and reordering 340 (FIG. 3). Prior to the reorder operation, tokens in sequence 610 have respective positions 620. In the example of FIG. 6, two masked tokens are moved to the front of sequence 610. Upon completion of the reorder operation, tokens are in sequence 630 having respective positions 640.

Figure 7:
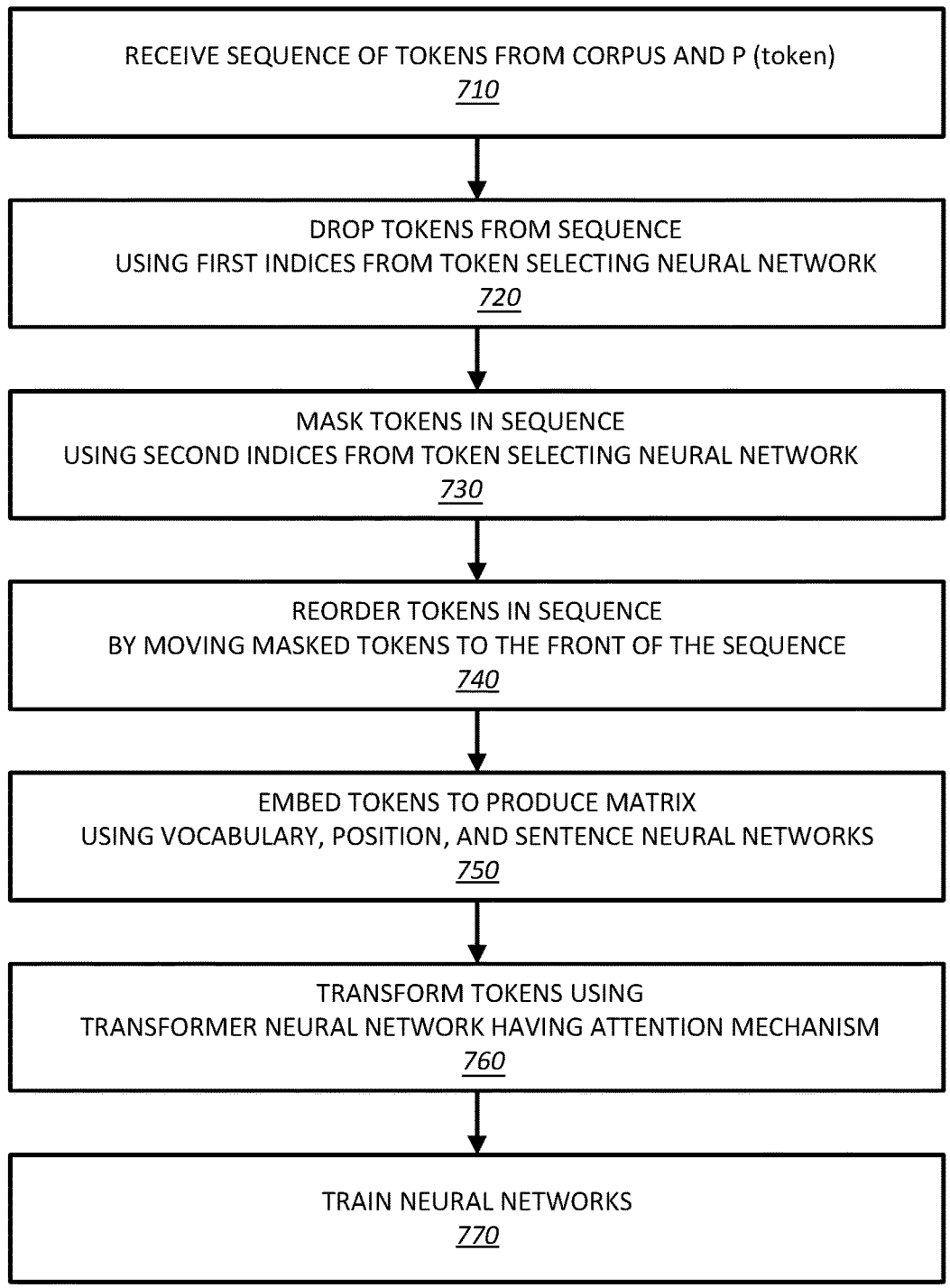
FIG. 7 illustrates a flow diagram for training a neural network according to various embodiments.

FIG. 7 illustrates method 700 that may be performed by system environment 300 (FIG. 3) for training a transformer neural network, in accordance with certain embodiments. Commencing at step 710, an input sequence of tokens and (relative) probabilities associated with the occurrence of the tokens may be received. In some embodiments, sequences of tokens are received from corpus 310 (FIG. 3).

At step 720, tokens in the input sequence may be selected and the selected tokens may be removed from the input sequence. Generally, the selected (and dropped) tokens do not provide useful information (context) about the sequence for training purposes. In some embodiments, token selecting neural network 320 (FIG. 3) may determine which tokens to drop and token dropping 330 may remove the tokens to be dropped. For example, k tokens (out of n tokens) remain in the sequence after tokens are dropped. An example drop operation was shown in FIG. 4.

At step 730, tokens in the sequence (with the dropped tokens omitted) may be selected and the selected tokens masked. Generally, the selected (and masked) tokens appear rarely in sequences and masking these tokens accelerates neural network (e.g., transformer neural network 360 (FIG. 3)) training. For example, m tokens may be masked. In some embodiments, token select neural network 320 (FIG. 3) may determine which tokens to mask and token masking and reordering 340 may mask the selected tokens. An example mask operation was shown in FIG. 5.

At step 740, the tokens in the sequence may be reordered. For example, the sequence may be reordered by placing the masked tokens at the front (beginning) of the sequence. Step 740 may be performed by token masking and reordering 340. An example reorder operation was shown in FIG. 6.

At step 750, each token in the masked sequence may be encoded into a vector with position information. For example, each of the tokens can be encoded into one or more floating-point numbers (e.g., IEEE-754). Step 750 may produce an S×H array of vectors (matrix), where dimension S is the length (number of words or tokens) in a sequence (sentence) and dimension H is the size of a token (word). Each row of the S×H matrix stores a token. The vectors are at least approximately orthogonal. Step 750 may be performed by embedding neural network 350.

At step 760, the S×H matrix may be transformed using a transformer neural network (e.g., transformer neural network 360 in FIG. 3) to produce a transformed matrix. At step 770, one or more of the neural networks (e.g., token selecting neural network 320, embedding neural network 350, and transformer neural network 360 in FIG. 3) can be trained using the transformed matrix and a known result set corresponding to the input matrix. In accordance with some embodiments, step 770 is performed by training 370.

Embodiments of system environment 100 and system environment 300 offer improvements to neural network training, such as removing tokens that do add context, masking tokens which appear less frequently, and reordering tokens in the sequence. Combinations of these improvements can yield faster convergence time by granting the neural networks exposure to smaller sequences and important tokens. Moreover, the reordering can optimize operations within neural networks, such as transformer neural network 160 and transformer neural network 360. Generally, neural networks may operate using matrices having dimensions S×H throughout. By moving the masked tokens to the front of the sequence, reduced-size matrices (e.g., k-m×H) may be used, where k is the number of tokens in the sequence after dropping tokens and m is the number of masked tokens. For example, a classifier may multiply an S×H by a large H×V vocabulary table (e.g., reverse operation of vocabulary 352 in FIG. 3). Since the masked terms are at the front of the sequences, the masked tokens may be put into a smaller matrix m×H. Here, the classifier may perform a substantially smaller multiplication of m×H by H×V.

Figure 8:
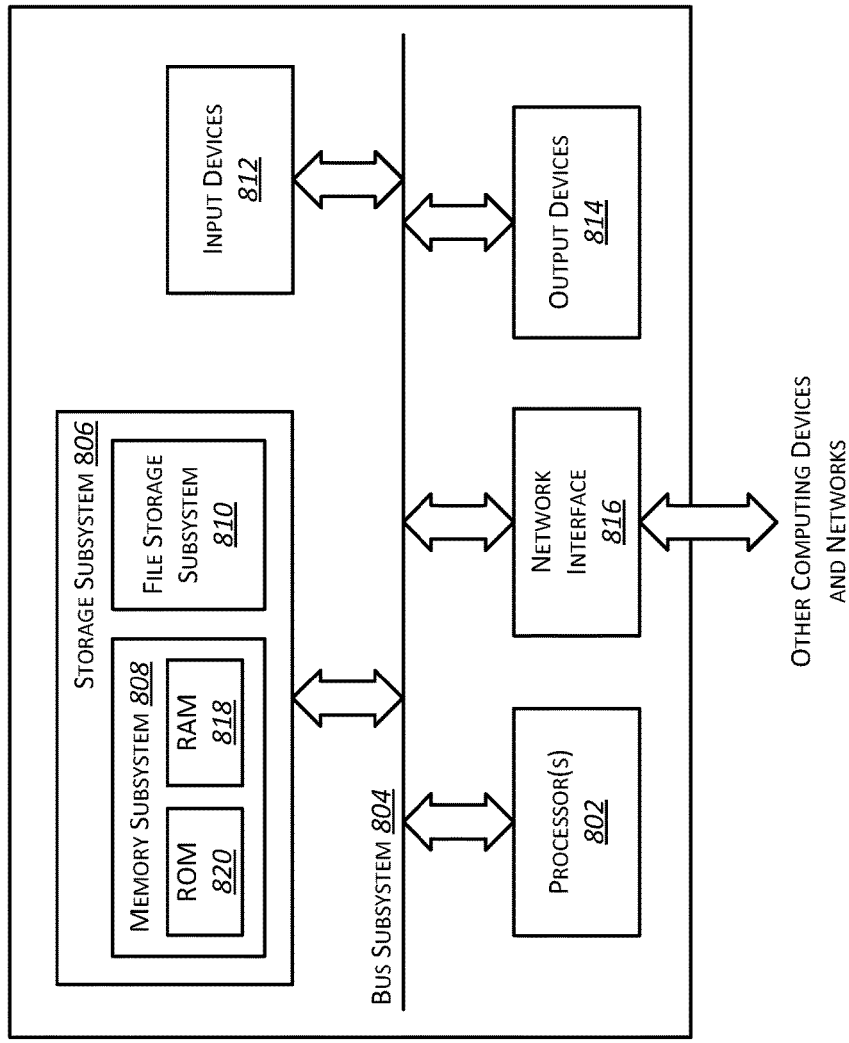
FIG. 8 illustrates a simplified block diagram of an example computing system according to various embodiments.

FIG. 8 depicts a simplified block diagram of an example computer system 800 according to certain embodiments. Computer system 800 can be used to implement any of the computing devices, systems, or servers described in the foregoing disclosure, such as system environment 100 (FIG. 1) and system environment 300 (FIG. 3). As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 810), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 808 and 810 represent non-transitory computer-readable storage media that can store program code and/or data that provide the functionality of embodiments of the present disclosure.

Memory subsystem 808 includes a number of memories including a main random access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Figure 9:
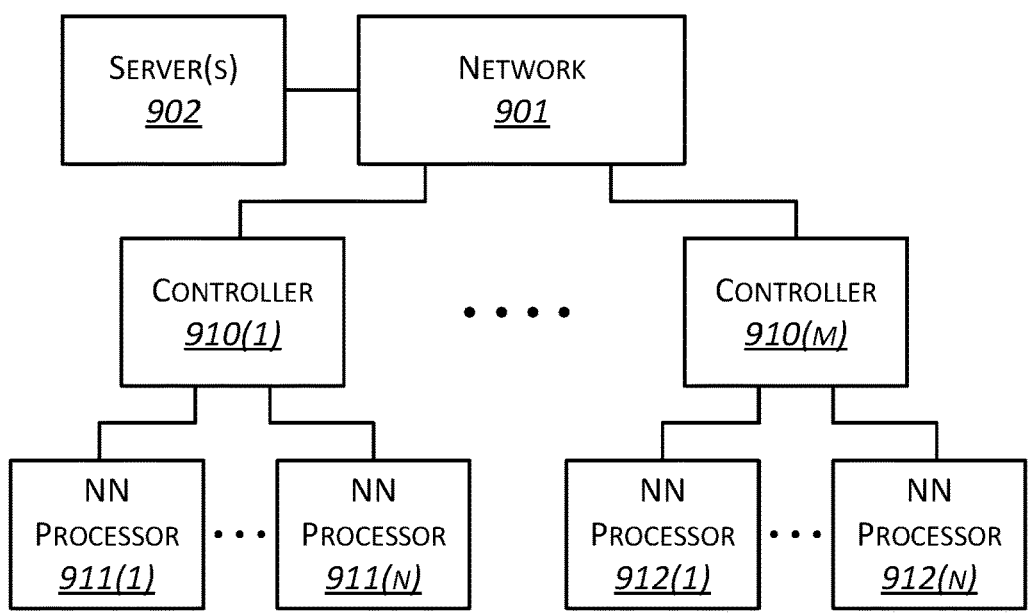
FIG. 9 illustrates a simplified block diagram of an example neural network processing system according to various embodiments.

FIG. 9 illustrates a neural network processing system 900 according to some embodiments. This example system may be used to implement the system environments shown in FIG. 1 or FIG. 3, or both, for example. In various embodiments, neural networks according to the present disclosure may be implemented and trained in a hardware environment comprising one or more neural network processors. A neural network processor may include various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example.

In this example environment, one or more servers 902 comprising architectures illustrated in FIG. 8 above, may be coupled to a plurality of controllers 910(1)-910(M) over a data network 901. Controllers 910(1)-910(M) may also comprise architectures illustrated in FIG. 8 above. Each controller 910(1)-910(M) may be coupled to one or more NN processors, such as processors 911(1)-911(N) and 912(1)-912(N), for example. The NN processors are optimized for neural network computations. Server 902 may configure controllers 910 with NN models and inputs to the models to be loaded and executed by NN processors 911(1)-911(N) and 912(1)-912(N) in parallel, for example. Models may include spreading neural networks, transformer neural networks, and de-spreading neural networks and inputs may include an input layer or matrix, for example. NN processors may load the models and apply the inputs to produce output results. NN processors may also implement training algorithms described herein, for example.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A computer system for accelerating sequence-based neural network training comprising:
   a processor; and
   a memory having stored thereon program code that, when executed by the processor, causes the processor to:
      process a first sequence of tokens to produce a second sequence of tokens, wherein the second sequence of tokens has a smaller number of tokens than the first sequence of tokens;
      mask one or more tokens in the second sequence to produce masked tokens;
         move the masked tokens to the beginning of the second sequence to produce a third sequence;
      encode tokens in the third sequence into a set of numeric vectors in a first array;
      process the first array in a transformer neural network to determine correlations among the third sequence, the processing of the first array producing a second array; and
      provide the second array as an input to a neural network training model.

2. The computer system of claim 1, wherein the tokens are words.

3. The computer system of claim 1, wherein the processing the first sequence of tokens uses probabilities that tokens occur to drop tokens from the first sequence of tokens to produce the second sequence of tokens.

4. The computer system of claim 1, wherein the processing the first sequence of tokens uses a neural network to drop tokens from the first sequence of tokens to produce the second sequence of tokens.

5. The computer system of claim 1, wherein the masking uses inverse probabilities that tokens occur to mask the one or more tokens.

6. The computer system of claim 1, wherein the masking uses a neural network to mask the one or more tokens.

7. The computer system of claim 1, wherein the vectors in the first array are at least approximately orthogonal.

8. The computer system of claim 7, wherein the first array has a first dimension corresponding to a sequence length equal to a number of words in each sequence and a second dimension corresponding to a size of the numeric vector.

9. The computer system of claim 1, wherein the program code further causes the processor to:
   train the transformer neural network using the second array and a known result associated with the first sequence of tokens.

10. The computer system of claim 1, wherein the transformer neural network comprises an attention layer.

11. A method for accelerating sequence-based neural network training comprising:

processing a first sequence of tokens to produce a second sequence of tokens, wherein the second sequence of tokens has a smaller number of tokens than the first sequence of tokens;

masking one or more tokens in the second sequence to produce masked tokens;

moving the masked tokens to the beginning of the second sequence to produce a third sequence;

encoding tokens in the third sequence into a set of numeric vectors in a first array;

processing the first array in a transformer neural network to determine correlations among the third sequence, the processing of the first array producing a second array; and providing the second array as an input to a neural network training model.

12. The method of claim 11, wherein the tokens are words.

13. The method of claim 11, wherein the processing the first sequence of tokens uses probabilities that tokens occur to drop tokens from the first sequence of tokens to produce the second sequence of tokens.

14. The method of claim 11, wherein the processing the first sequence of tokens uses a neural network to drop tokens from the first sequence of tokens to produce the second sequence of tokens.

15. The method of claim 11, wherein the masking uses inverse probabilities that tokens occur to mask the one or more tokens.

16. The method of claim 11, wherein the masking uses a neural network to mask the one or more tokens.

17. The method of claim 11, wherein the vectors in the first array are at least approximately orthogonal.

18. The method of claim 11, further comprising:

training the transformer neural network using the second array and a known result associated with the first sequence of tokens.

19. The method of claim 11, wherein the transformer neural network comprises an attention layer.

20. A non-volatile computer-readable storage medium having stored thereon program code executable by a computer system for accelerating sequence-based neural network training, the program code causing the computer system to:

process a first sequence of tokens to produce a second sequence of tokens, wherein the second sequence of tokens has a smaller number of tokens than the first sequence of tokens;

mask at least some tokens in the second sequence to produce masked tokens;

move the masked tokens to the beginning of the second sequence to produce a third sequence;

encode tokens in the third sequence into a set of numeric vectors in a first array;

process the first array in a transformer neural network to determine correlations among the third sequence, the processing of the first array producing a second array; and provide the second array as an input to a neural network training model.

* * * * *